United States Patent Office 3,494,731
Patented Feb. 10, 1970

3,494,731
PIGMENT AND METHOD OF PREPARING THE SAME
Howard H. Reynolds, Belmont, Mass. (% Richard P. Crowley, 125 High St., Boston, Mass. 02110)
No Drawing. Filed Dec. 26, 1967, Ser. No. 693,145
Int. Cl. C01f 7/02
U.S. Cl. 23—51                                                    8 Claims

ABSTRACT OF THE DISCLOSURE

An improved calcium sulfoaluminate pigment having a fine and essentially uniform particle size is provided by heating a mixture of a hydrated aluminum sulfate and a basic calcium salt together to a temperature sufficient to melt a small portion of the aluminum sulfate (e.g., 80 to 100° C.) and form an essentially saturated solution of the reactants and maintaining the temperature of the reaction constant whereby improved calcium sulfoaluminate pigment known as satin white is precipitated from the saturated solution of the reaction mixture.

BACKGROUND OF THE INVENTION

The term satin white is used to describe a pigment used in the coating of paper or other substrates which provides unique properties to such coatings. This pigment is produced essentially by the reaction of aluminum sulfate and calcium hydroxide in an aqueous solution or suspension. Microscopic and chemical analyses have revealed that the product of this reaction is not a simple double decomposition, as might be expected, but produces a chemical compound of the general form of calcium sulfoaluminate, having a composition of

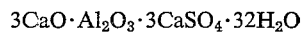
$$3CaO \cdot Al_2O_3 \cdot 3CaSO_4 \cdot 32H_2O$$

Industrially, this compound is manufactured by adding commercial, iron-free alum to a slurry of calcium hydroxide, in an approximate ratio of 6 mols of lime to 1 mol of commercial alum, $Al_2(SO_4)_3 \cdot 18H_2O$, accompanied by intensive stirring. The reaction mass becomes exceedingly viscous and requires considerable power in a pug mill or similar apparatus to provide adequate stirring. After the reactants are completely added, the mixture is stirred for a number of hours in order for the proper crystal size to develop. Because of the complexity of the reaction, it is sometimes difficult to obtain reproducible results from batch to batch, and these same difficulties have prevented the use of continuous processes for the manufacture of this pigment.

In the field of paper coating, satin white pigments have been highly regarded because of a number of potential and actual advantages, to wit: (1) after coating and drying, the pigment can be brushed or calendered to a soft, smooth, finish, difficult to obtain with other pigments; (2) this coating is very receptive to printing ink, and hence is used for coating of printing papers; (3) the presence of excess alkali in the pigment, provided by the excess lime, provides a waterproofing agent when casein is used as the binder for the coating color; and (4) because of the low cost of the raw materials, the cost of the pigment should be low.

As a matter of commercial practice, however, several problems arise in the use of satin white pigments:

First, it has been impossible to obtain stable, reliable pigments in high concentration with the desired properties. This is because the viscosity of the slurry of satin white in water becomes too thick to be handled in conventional apparatus at a solids content above about 30%. Because of this low concentration of the pigment, it is impossible to make up coating suspension or "colors" for use on coating apparatus as would be economically desirable. This results in the necessity of requiring excessive drying and the inability of adding other desirable components to the coating color because the viscosity is too high.

Second, the satin white pigments produced commercially have what is known as a high "adhesive demand." That is to say, the amount of adhesive required to produce a satisfactory coating with good adhesion to the paper is excessively high, when using satin white pigments. This is particularly true when casein is used, much favored because it can be rendered waterproof by the formation of calcium caseinate due to the excess alkali in the satin white. Such a high adhesive demand greatly reduces the desirability of the pigment because of the great increase in cost of the adhesive.

Third, because of the nature of the pigment, it is not possible to dry the commercial satin white and then re-disperse in solutions when required for coating colors. This is a great disadvantage, since it means shipping suspensions of the pigment in the form of 20–30% slurry, with consequent substantial increases in both shipping charges and handling costs. Because of the hydrous nature of the pigment, drying destroys the beneficial structure of the pigment, resulting in a hard, refractory pigment which can be dispersed with the greatest difficulty, and which when re-dispersed does not show the beneficial properties of satin white pigments not so dried.

Attempts have been made to overcome these disadvantages. Dispersing agents have been added, together with fluidizing chemicals, in an effort to provide a satin white pigment slurry with a high percentage of solids. Unfortunately, the addition of such agents only provides slight improvement in solids content and tends to affect the efficiency of the pigment in coating formulations. In some cases, sodium sulfate has been added to the reaction mixture in an effort to precipitate calcium sulfate alone, and to provide sodium ions which might assist in dispersibility. Unfortunately, none of these expediencies have to date been commercially successful. The result has been that the number of suppliers of the pigment has been extremely limited, and most users manufacture their own pigments in order to control compositions and to reduce shipping costs. The costs, because of the small size of these individual operations, has remained high, and this coupled with the high adhesive demand, has precluded the use of satin white as paper coating pigment, except in those cases where the beneficial results of its use more than offset its added cost.

SUMMARY OF THE INVENTION

My invention concerns improved metal sulfoaluminate pigments which pigments are characterized by a fine and essentially uniform particle size and to the process of preparing such pigments. In particular my invention relates to a new and improved calcium sulfoaluminate pigment known as satin white and to the process of preparing such pigment through the reaction of a hydrated aluminum sulfate with a basic metal salt in an essentially saturated solution of the reactants at a constant temperature.

The satin white pigment (calcium sulfoaluminate) prepared by my process provides improved gloss, brightness and ink receptivity when used in paper coating formulations. In general my process comprises preparing a mixture of a hydrated water-soluble aluminum salt such as a hydrated aluminum sulfate as one reactant and at least one inorganic basic metal salt as the other reactant, which reactant will react to provide a water-insoluble double precipitate compound. The aluminum is preferably the hydrated commercial alum, while the basic metal salt must be a water-soluble metal salt which will provide a metaion in the water of reaction so as to form the precipitate. Typical metals for such salts would include but not be limited to: barium, calcium, magnesium, zinc, cadmium and the like. Typical salts would include oxides, hydroxides, chlorides, carbonates, sulfates and so forth. Specific inorganic metal salts would include calcium oxide, calcium hydroxide and barium oxide, barium hydroxide, zinc oxide, calcium carbonate, calcium sulfate and the like or mixtures thereof. The mixture of the reactants is then heated with stirring to at least a temperature sufficient to melt a small portion of the hydrated aluminum salt so that a saturated water solution consisting essentially of a solid-solid reaction is obtained. A small portion of the aluminum salt dissolves in the water of hydration and reacts immediately with the basic metal salt under essentially saturated solution conditions and the desired metal sulfoaluminate is precipitated. During reaction the mixture is maintained at a constant temperature so as to control and obtain uniform and fine particle size. The reaction will proceed with the reactants under essentially saturated conditions and the particle size of the double precipitate compound will be very uniform. With hydrated aluminum sulfate (alum) heating to a temperature of about 80 to 100° C. and preferably 85 to 95° C. is sufficient for the purposes of my process. The advantages of my invention are obtained where the reaction is carried out under constant temperature and constant concentration of the reactants. The addition of an excessive amount of water in the reaction as used in the prior art must be avoided. In my process the reactants may be employed in a stoichiometric amount or more or less of the aluminum salt employed where desired. For the purposes of illustration only my invention will be described for the preparation of a calcium sulfoaluminate pigment.

Von Weimarn's Law of Precipitation states generally that the precipitation of a solid from reacting solutions will result in a precipitate of colloidal dimensions if the concentration of the reactants is either very high or very low. Extremely finely-divided and uniform pigments with controllable particle size can be prepared controlling the concentration of the reactants.

The present invention employs the application of the Von Weimarn law to my particular process of preparing satin white so that an improved satin white of fine, uniform particle size and new characteristic is attained. It has been found that the difficulties experienced with pigments made by the normal precipitation methods used commercially lay in the fact that the concentration of the reactants was continually changing, and consequently the particle size of the pigments produced continually changed. Furthermore, reaction of soluble lime required further solution of the solid lime particles, and this made the reaction both non-uniform with respect to time, and very dependent on the temperature.

Calcium hydroxide is soluble in water to the extent of 1.85 parts per 1,000 of water at 0° C. and 0.77 part at 100° C., while commercial alum is very soluble, being 869 parts per 1,000 at 0° C., and over 10 times that at 100° C. Commercial alum will melt in its own water of hydration ($18H_2O$) at temperatures somewhat below 100° C. In the conventional method of preparing satin white pigment, it is possible to use calcium hydroxide only in the slurry form (mostly suspended calcium hydroxide), if a high concentration of the finished pigment is to be obtained. The alum can be used in almost any concentration.

It was found that if a constant set of concentration conditions could be maintained, the reaction must be carried out essentially under conditions where both reactants were in high concentration, and maintained in this condition throughout the reaction. The fact that commercial alum contains water of hydration (e.g., $18H_2O$) and melts below 100° C. became of considerable advantage in providing precise reaction conditions. My process provides that the reaction take place essentially in a solid/solid environment, the only water for the reaction being provided being essentially the water of hydration of the alum. Theoretically, the reaction could produce 100% hydrate calcium sulfoaluminate of uniform particle size, without ever going through a slurry stage. With my improved process it is possible to provide an improved satin white pigment in high concentration.

In my process the reaction is carried out in the solid or semi-solid state throughout most of the reaction, so that the concentrations of the reactants are thus controlled essentially at saturation for both reactants. In a typical condition, solid calcium hydroxide is mixed with dry alum (18 molecules of $H_2O$) in any convenient mixing device. This mixture is stable at normal temperatures, since the reaction will not proceed in the absence of water.

The mixture is placed into a mixing apparatus which will provide both mixing and a shearing action. Apparatus of this type is well known might be a Sigma-blade mixer of the Baker-Perkins type, or a Mixmuller, although my process is by no means limited to these types of mixers. The mixture is heated with stirring to about 90–95° C., at which point the alum begins to melt. This provides sufficient water to dissolve a little alum and a little lime, thus providing a very concentrated and practically saturated solution of both reactants. The pigment is immediately precipitated, providing substantial heat of reaction. This heat is generally more than sufficient to continue the heating of the reaction mix, and in some cases cooling must be provided to maintain constant temperature. The heat of reaction provides a reservoir to continue the reaction at a temperture sufficient to provide saturated solution of the reactants, e.g., 90–100° C.

In order to maintain the reaction temperature at a particular level, the reaction mass may be cooled, or small amounts of water may be added. The reaction must be carried out under essentially saturated conditions for the reactants for optimum results. The reaction may be continued until all the alum is consumed. The pigment produced by my process is of uniform particle size and in the near-colloidal range of about 0.05 to 0.5, e.g., 0.1–0.2 microns. The alum consumption may be followed by a measurement of the temperature. A sharp drop in temperature signifies that all the alum has been consumed. At about this point or thereafter the reaction mass may be diluted to any given consistency and solids content, by the addition of water, alcohol or other liquids.

Various modifications may be made to my process to enhance the pigment or to improve its properties. Detergents, stabilizers, fillers, dispersants, pigments, resins, gums, coloring agents and other additives may be used to improve or modify the properties of my improved satin white pigment. Dispersing agents such as phosphates, and the like may be added to improve behaviour in the coating color. Protective colloids, such as bentonite, organic polymers such as the polyacrylates, carboxymethyl-cellulose, polyvinyl pyrrolidone and the like may be added to improve the stability of the pigments when added to the other components of a coating color.

While the preferred stoichiometric ratio of lime to alum is about 6 mols to 1, this process is by no means limited to this mixture but may include an excess of either reactant as desired. Other chemicals which might enhance the pigment properties may be added to the reaction mixture. These may include for example metal oxides, sulfates, chlorides, and hydroxides such as barium hydroxide to form a barium sulfate, titanium dioxide, zinc oxide, magnesium oxide and similar chemicals which would enhance the properties of brightness, gloss, etc. of the final paper coating or pigment.

My improved satin white pigment produced by my process has many advantages over previous manufacturing methods. The process is inexpensive, with essentially 100% yield of pigment. The pigment can be produced in concentrations much higher than present commercial methods. The high concentration of pigment makes possible coating or other pigment compositions with a solid content of 55% or higher and with viscosities easily handled with commercial coating and application devices. My pigments produced in my process provide coatings which are more uniform and have generally improved properties such as brightness, gloss and ink receptivity then coatings made from prior commercial processes.

DESCRIPTION OF THE PREFERRED EMBODIMENT

Example 1

500 grams of hydrated lime ($Ca(OH)_2$) are mixed in a blender with 750 grams of hydrated alum

RHEOLOGICAL PROPERTIES OF COATING COLORS

| Example | $N_{500}$ | $U_{500}$ | $U_{1000}$ | F | M | L.I. |
|---|---|---|---|---|---|---|
| 3 | 0.420 | 0.332 | 0.262 | 177.0 | 0.1015 | 0.387 |
| 4 | 0.573 | 0.458 | 0.344 | 231.0 | 0.1652 | 0.482 |
| 5 | 0.611 | 0.477 | 0.354 | 269.4 | 0.1780 | 0.504 |
| 6 | 0.841 | 0.611 | 0.458 | 642.7 | 0.2220 | 0.484 |

$N_{500}$ is the apparent viscosity at 500 r.p.m., in poises (Hercules viscometer).
$U_{500}$ is the plastic viscosity at 500 r.p.m.
$U_{1000}$ is the plastic viscosity at 1,000 r.p.m.
F is yield value, grams/cu..
M is coefficient of thixotropy.
L.I. is Leveling Index.

PHYSICAL AND OPTICAL PROPERTIES OF HI-SOLIDS SATIN WHITE COATING COMPOSITIONS

| | Examples | | | | | | | |
|---|---|---|---|---|---|---|---|---|
| | 3 | | 4 | | 5 | | 6 | |
| Coating weight (lbs./3,000 ft.²) | 10.0 | 20.5 | 9.1 | 21.7 | 9.2 | 19.2 | 11.2 | 20.3 |
| pH | 9.7 | 9.7 | 9.8 | 9.8 | 10.1 | 10.1 | 10.2 | 10.2 |
| Brightness, percent: | | | | | | | | |
| Uncalendered | 83.5 | 86.0 | 84.0 | 85.5 | 85.5 | 87.0 | 85.0 | 87.0 |
| Calendered | 81.0 | 83.5 | 82.0 | 84.0 | 83.0 | 85.0 | 83.5 | 85.0 |
| Printing opacity: | | | | | | | | |
| Uncalendered | 0.920 | 0.940 | 0.930 | 0.945 | 0.935 | 0.955 | 0.935 | 0.950 |
| Calendered | 0.915 | 0.925 | 0.915 | 0.930 | 0.920 | 0.935 | 0.920 | 0.935 |
| Gloss, percent: | | | | | | | | |
| Uncalendered | 43 | 50 | 34 | 40 | 34 | 40 | 40 | 40 |
| Calendered | 96 | 96 | 94 | 96 | 96 | 96 | 94 | 96 |
| IGT, ft./min. (No. 5 ink) | 450 | | 450 | | 355 | | 295 | |

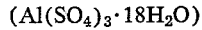

Steam is applied to the jacket of the blender until a temperature of 80° C. is reached. The reaction begins after about 5 minutes the steam can be turned off and the reaction allowed to proceed. It may be necessary to run cold water into the blender jacket in order to hold the temperature constant. After the reaction has continued for about 30 minutes, the temperature begins to drop, and water may be added in 100 ml. increments until an easily flowing consistency is reached. When the temperature has reached about 60° C., the pigment may be discharged from the mixer and used immediately or held for an indefinite period before being made into a coating color. The concentration of the pigment under these conditions is about 64% solids.

Example 2

The same as Example 1, except that Tamol 850 (a dispersing agent and protective colloid) is added with the water to the extent of 3% on the solids basis as a 1% solution, and enough distilled water, at intervals, to provide a solids concentration at the end of the reaction of about 65%.

Examples 3, 4, 5 and 6 represent the results and the properties of the paper coatings made from the pigment of Example 1.

HI-SOLIDS SATIN WHITE—COATING FORMULATIONS

Example 3: Percent
 Coating solids _____ 51.7
 Tamol 850 _____ 3.0
 Polyco 2715 _____ 20.0
Example 4:
 Coating solids _____ 51.7
 Tamol 850 _____ 3.0
 Rhoplex B-15 _____ 20.0
Example 5:
 Coating solids _____ 48.3
 Tamol 850 _____ 4.0
 SP Latex 900–S2 _____ 20.0
Example 6:
 Coating solids _____ 48.3
 Tamol 850 _____ 4.0
 Polyco 0440 _____ 20.0

DEFINITIONS

*Tamol 850.*—A sulfonated naphthalene-formaldehyde condensation product used as a dispersing and protective agent (Rohm & Haas Company).

*Polyco 2715 and Polyco 0440.*—Polyacrylic emulsions or latices of fine particle size (Borden Company).

*Rhoplex B–15.*—A polyacrylic latex emulsion used as a film-former (Rohm & Haas Company).

*SP Latex 9900–S2.*—A butadiene-styrene latex of uniform particle side (Southeast Polymer Company).

*Daxad.*—A sulfonated naphthalene-formaldehyde condensation product used as a dispersing agent (Dewey & Almy D. W., W. R. Grace Co.).

*IGT.*—A device used for testing the adhesive properties of a printing ink relative to the surface to be printed. Commonly used to measure the adhesion of a coating to the surface of paper. A more quantitative measure of surface "pick" than provided by the common Dennison Wax Pick method. The machine is manufactured by the Institut voor Graphische Techniek, Sweden.

*L.I.*—Means "Leveling Index," and is an indication of how well a coating will level out on the surface of the paper after it has been applied.

*F.*—Means yield value, in grams/square centimeter. A measure of the thixotropy of the coating color.

*M.*—Means the coefficient of thixotropy, a characterization of a coating color; both F and M are derived mathematically from the values obtained on a Hercules Hi-Shear Viscometer.

Example 7

An improved metal sulfomagnesium pigment is prepared by my process as follows:

154 grams of barium oxide are mixed in a blender with 247 grams of epsom salts (magnesium sulfate heptahydrate). Steam is applied to the jacket of the mixer until a temperature of 80° C. is reached. A few grams of water are added to accelerate initiation of the reaction, and the steam is turned off as the reaction proceeds. The temperature is maintained at 80° C., and the minimum amount of water required to maintain the reactants at mixable consistency is added during the reaction. After the reaction ceases, as noted by a drop in temperature, additional water and additives may be added to produce an easily flowing consistency. The pigment, consisting of a complex mixture of magnesium hydroxide, barium sulfate, magnesium sulfate, barium magnesium sulfate, and barium hydroxide, may be used as a filler material or in paper coating compositions.

Thus where the hydrated sulfate has a melting point such as alum the water of hydration can be used as the only water to dissolve the reactants in the inition phase or where the hydrated metal sulfate has no melting point then a small amount of water may be added, such as 0.01 to 5.0 weight percent (e.g., 0.1 to 2.0). The reactions are carried out in essentially solid-solid phases while the mixture is essentially dry or in a fluid or plastic condition.

What is claimed is:

1. The process of preparing an inorganic compound useful as a pigment which comprises heating a mixture consisting essentially of a hydrated aluminum sulfate as a first reactant and at least one basic metal salt capable of reacting with the aluminum sulfate as a second reactant to form a double precipitate compound of a water-insoluble metal sulfoaluminate, the mixture being heated to a temperature sufficient to melt a small portion of the hydrated aluminum sulfate in the water of hydration and form an essentially saturated solution of the first and second reactants in said water of hydration; and maintaining the temperature of the reaction mixture so that the reaction is carried out at substantially constant temperature, whereby a finely divided essentially uniform particle size metal sulfoaluminate is precipitated from the solution.

2. The process of claim 1 wherein the basic metal salt is a salt of metals selected from the group consisting of barium, calcium, magnesium and zinc and mixtures thereof.

3. The process of claim 1 wherein the aluminum sulfate is commercial alum and the basic metal salt is hydrated lime with the reactants having a mole ratio of lime to alum of about 6 to 1.

4. A process of claim 1 wherein the reaction is maintained from about 80 to 100° C.

5. The process of claim 1 wherein the reactants contain a stoichiometric excess of the basic metal salts.

6. The process as defined in claim 1 wherein the metal salt is selected from the group consisting of barium, calcium, magnesium, zinc and cadmium and the oxides, hydroxides, chlorides, carbonates, sulfates thereof.

7. The process of claim 1 wherein only sufficient water is added during the reaction to maintain the reactants in the fluid condition.

8. The process of claim 1 wherein the reactants contain a stoichiometric excess of hydrated aluminum sulfate.

References Cited

UNITED STATES PATENTS

| | | |
|---|---|---|
| 2,248,032 | 7/1941 | Dunn et al. |
| 2,312,918 | 3/1943 | Lioddel et al. _____ 23—50 |
| 2,413,184 | 12/1946 | La Lande _____ 23—52 |
| 2,947,643 | 8/1960 | Kamlet. |
| 3,148,998 | 9/1964 | Clearfield _____ 23—50 X |

FOREIGN PATENTS 856,840 11/1952 Germany.

HERBERT T. CARTER, Primary Examiner

U.S. Cl. X.R.

23—52, 117; 106—288, 292, 306, 308; 117—152, 169; 162—181